US008417155B2

(12) United States Patent
Fukushima et al.

(10) Patent No.: US 8,417,155 B2
(45) Date of Patent: Apr. 9, 2013

(54) SWING-GEAR MECHANISM AND IMAGE FORMING APPARATUS HAVING MULTIPLE SPEED MODES

(75) Inventors: Tatsuo Fukushima, Osaka (JP); Katsumi Kumada, Osaka (JP); Nobuhiko Kita, Osaka (JP); Sei Onuma, Osaka (JP)

(73) Assignee: Ricoh Company Limited, Tokyo (JP)

( * ) Notice: Subject to any disclaimer, the term of this patent is extended or adjusted under 35 U.S.C. 154(b) by 315 days.

(21) Appl. No.: 12/805,673

(22) Filed: Aug. 12, 2010

(65) Prior Publication Data

US 2011/0052261 A1 Mar. 3, 2011

(30) Foreign Application Priority Data

Aug. 28, 2009 (JP) ................................ 2009-198660

(51) Int. Cl.
*G03G 15/00* (2006.01)
*F16H 3/00* (2006.01)
*F16H 3/34* (2006.01)

(52) U.S. Cl.
USPC ............... 399/167; 74/810.1; 74/352; 74/354

(58) Field of Classification Search .................. 399/167; 74/324, 352, 354, 412 R, 810.1; 475/12
See application file for complete search history.

(56) References Cited

U.S. PATENT DOCUMENTS 4,986,525 A * 1/1991 Takagi et al. ................ 271/114
5,729,779 A * 3/1998 Oshima ........................ 396/418
7,154,639 B2 * 12/2006 Chien .......................... 358/474
7,334,749 B2 * 2/2008 Terauchi et al. ............. 242/250
7,555,244 B2 6/2009 Idehara et al.
7,580,653 B2 8/2009 Idehara et al.
7,611,106 B2 11/2009 Kondo et al.
7,689,142 B2 3/2010 Kita et al.
2004/0026849 A1 * 2/2004 Kang et al. .............. 271/265.01
2007/0110473 A1 5/2007 Kondo et al.
2007/0110475 A1 5/2007 Idehara et al.
2007/0166073 A1 7/2007 Idehara et al.
2007/0246638 A1 10/2007 Idehara et al.
2008/0007935 A1 1/2008 Kondo et al.

(Continued)

FOREIGN PATENT DOCUMENTS

JP 09-046995 2/1997
JP 2001010141 A * 1/2001

(Continued)

*Primary Examiner* — David Gray
*Assistant Examiner* — Tyler Hardman
(74) *Attorney, Agent, or Firm* — Harness, Dickey & Pierce, P.L.C.

(57) ABSTRACT

An image forming apparatus has a high-speed mode and a low-speed mode and includes a speed switch unit configured to select the high-speed mode or the low-speed mode by switching a rotation direction of a drive source. The speed switch unit includes a drive gear attached to a rotating shaft of the drive source; a first drive gear series transmitting a rotating power of the drive source upon rotation in a first direction to an image carrier; and a second drive gear series transmitting a rotating power of the drive source upon rotation in a second direction to the image carrier, the second drive gear series having a larger reduction ratio than the first drive gear series. The speed switch unit causes the drive gear to be selectively connected to the first drive gear series or the second drive gear series depending on the rotating direction of the drive source.

20 Claims, 6 Drawing Sheets

U.S. PATENT DOCUMENTS

| | | | | |
|---|---|---|---|---|
| 2008/0013972 | A1* | 1/2008 | Matsuda | 399/45 |
| 2008/0050146 | A1 | 2/2008 | Kita et al. | |
| 2008/0063425 | A1 | 3/2008 | Idehara et al. | |
| 2008/0075502 | A1 | 3/2008 | Tada et al. | |
| 2008/0217834 | A1* | 9/2008 | Sasahara | 270/37 |
| 2008/0226352 | A1 | 9/2008 | Tananka et al. | |
| 2008/0226358 | A1 | 9/2008 | Hanashima et al. | |
| 2008/0253796 | A1 | 10/2008 | Idehara et al. | |
| 2008/0279585 | A1 | 11/2008 | Furuichi et al. | |
| 2008/0292356 | A1 | 11/2008 | Furuichi et al. | |
| 2009/0035041 | A1* | 2/2009 | Yang | 399/401 |
| 2009/0056484 | A1 | 3/2009 | Hanashima et al. | |
| 2009/0074446 | A1 | 3/2009 | Idehara et al. | |
| 2009/0074456 | A1 | 3/2009 | Tada et al. | |
| 2009/0080937 | A1 | 3/2009 | Kita et al. | |
| 2009/0110432 | A1 | 4/2009 | Idehara et al. | |
| 2009/0152435 | A1 | 6/2009 | Kondo et al. | |
| 2009/0279933 | A1* | 11/2009 | Kawamura et al. | 400/579 |
| 2009/0285588 | A1 | 11/2009 | Furuichi et al. | |
| 2010/0061755 | A1 | 3/2010 | Furuichi et al. | |
| 2010/0067942 | A1 | 3/2010 | Hagiwara et al. | |
| 2010/0278560 | A1* | 11/2010 | Ino et al. | 399/167 |

FOREIGN PATENT DOCUMENTS

| | | |
|---|---|---|
| JP | 2002-089638 | 3/2002 |
| JP | 2007-212806 | 8/2007 |
| WO | WO 02/23065 | 3/2002 |

* cited by examiner

SWING-GEAR MECHANISM AND IMAGE FORMING APPARATUS HAVING MULTIPLE SPEED MODES

BACKGROUND OF THE INVENTION

1. Field of the Invention

The present invention generally relates to image forming apparatuses, such as copy machines, printers, facsimile machines, plotters, and multifunction peripherals (MFP) incorporating multiple image forming functions, such as copying and printing functions. More particularly, the present invention relates to an image forming apparatus having multiple image formation speed modes.

2. Description of the Related Art

An image forming apparatus is known in which a low-speed mode or a high-speed mode can be selected by a user. In the low-speed mode, image quality may be given priority, while in the high-speed mode, speed (productivity) may be given priority. In this type of an image forming apparatus, a drive source, such as a motor, may be connected to an image carrier, such as a photosensitive drum, via a series of drive gears. When the gear ratio of the series of drive gears is fixed, the high-speed mode and the low-speed mode may be switched by varying the number of rotations of the drive source.

In this type of an image forming apparatus, noise may increase in the high-speed mode. The noise during an image formation operation is known to be largely due to the noise level of the gear meshing frequency of drive source gears. The gear meshing frequency is the number of times two gears mesh with each other per second. For example, the gear meshing frequency of a drive source is the number of times a motor gear and a transmission gear mesh with each other per second. Thus, the gear meshing frequency, and hence the noise level, can be reduced by decreasing the number of rotations of the motor in the drive source. Desirably, the gear meshing frequency should be lowered below 100 Hz because the sound of such frequencies is difficult for humans to hear.

The drive source in this type of image forming apparatus may include a so-called FG (frequency-generating) output motor equipped with a frequency generator. Typically, the FG output motor has a pattern of frequency-generating pulse shapes ("FG pattern") disposed opposite a magnet of a rotating part of the motor. As the motor rotates, electromagnetic induction is caused between the magnet and the FG pattern, thereby producing a pulse current. Based on the pulse current, a feedback control is performed so that the rotating speed of the motor can be controlled (see Japanese Laid-Open Patent Application No. 09-46995, for example). The FG output motors are frequently used as a drive source for image forming apparatuses because of their inexpensive rotation control mechanism.

As mentioned above, the high-speed mode and the low-speed mode may be switched by changing the number of rotations of the drive source when the gear ratio the series of drive gears is fixed. In this case, when the rotation speed of the drive source in the high-speed mode is lowered in order to reduce the noise level of the gear meshing frequency of the drive source gears, the number of rotations for the low-speed mode also decreases because of the fixed gear ratio. As a result, the frequency generator may not be able to produce a sufficient level of pulse signal for the feedback control of the rotation speed of the motor.

Japanese Laid-Open Patent Application No. 2002-089638 discusses a drive apparatus including various motors, a simple planetary gear mechanism as an intermediate speed-reduction mechanism, and various speed-reduction units. In this drive apparatus, the motors and the speed-reduction units can be selectively engaged with the simple planetary gear mechanism on an input and an output end, respectively, in order to reduce vibration and noise.

Japanese Laid-Open Patent Application No. 2007-212806 discusses a rotating drive apparatus including a drive source, a series of gears, and a driven member. The gears are coupled via planetary gears for increasing accuracy of rotation of an output shaft and reducing the size in the shaft axial direction, while allowing the detachment of the driven member from the rotating drive apparatus.

SUMMARY OF THE INVENTION

In one aspect of the present invention, a swing gear mechanism includes a frame having a first and a second arch-shaped guide opening having a first end and a second end; a first swing gear supported by the frame with a shaft of the first swing gear being guided in the first arch-shaped guide-opening; a second swing gear supported by the frame with a shaft of the second swing gear being guided in the second arch-shaped guide opening; and a drive gear meshed with the first and the second swing gears and configured to rotate in a first or a second direction. The first swing gear and the second swing gear are displaced to the first end of the corresponding arch-shaped guide openings upon rotation of the drive gear in the first direction, or to the second end of the corresponding arch-shaped guide openings upon rotation of the drive gear in the second direction.

In another aspect of the present invention, an image forming apparatus includes the swing gear mechanism.

In yet another aspect of the present invention, an image forming apparatus has a high-speed mode and a low-speed mode and includes a drive source configured to be rotated in a first direction or a second direction; an image carrier configured to be rotated by the drive source; an optical scanning unit configured to scan the image carrier with a beam of light in order to form an electrostatic latent image on the image carrier; a developing unit configured to develop the electrostatic latent image on the image carrier into a visible image; a transfer unit configured to transfer the visible image onto a recording medium directly or indirectly; and a speed switch unit configured to select the high-speed mode or the low-speed mode by switching a rotation direction of the drive source. The speed switch unit includes a drive gear attached to a rotating shaft of the drive source; a first drive gear series configured to transmit a rotating power of the drive source upon rotation in the first direction to the image carrier; and a second drive gear series configured to transmit a rotating power of the drive source upon rotation in the second direction to the image carrier, the second drive gear series having a larger reduction ratio than the first drive gear series. The speed switch unit is configured to cause the drive gear to be selectively connected to the first drive gear series or the second drive gear series depending on the rotating direction of the drive source.

DETAILED DESCRIPTION OF THE PREFERRED EMBODIMENTS

Figure 1:
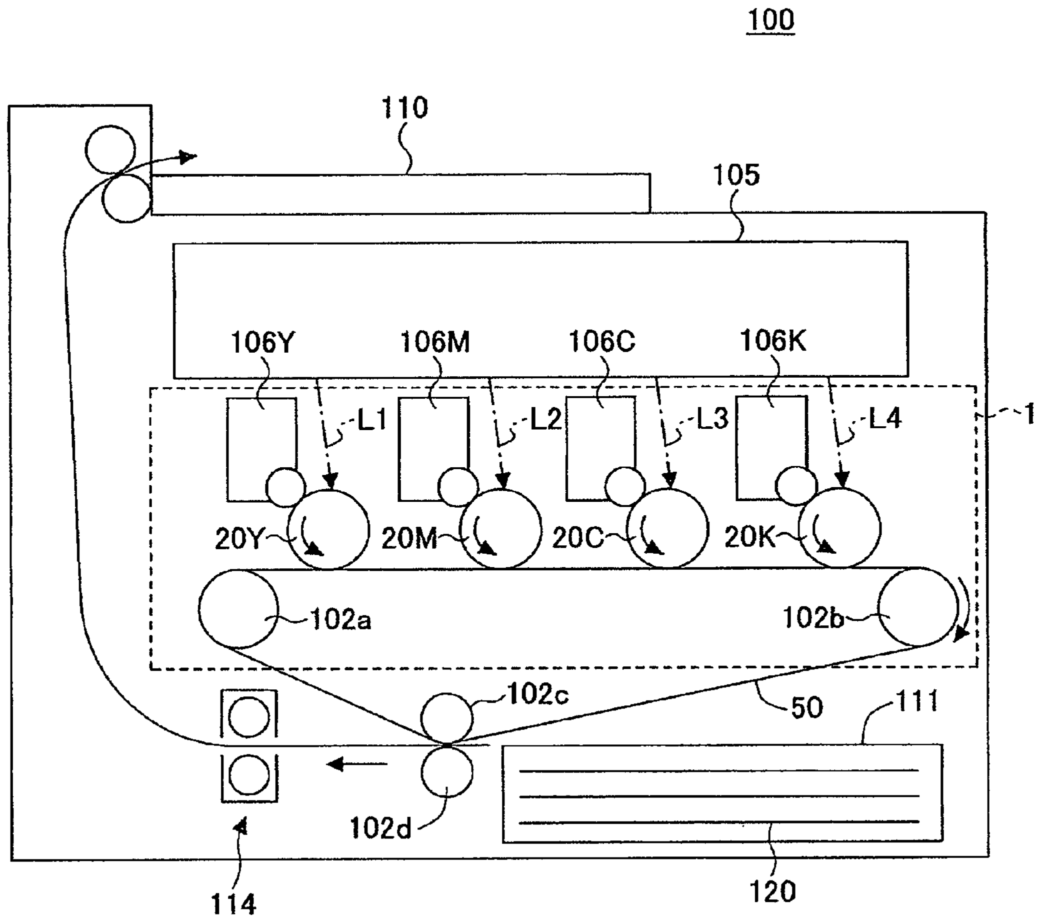
FIG. 1 illustrates a laser color printer as an image forming apparatus according to an embodiment of the present invention.

FIG. 1 illustrates a laser color printer 100 as an image forming apparatus according to an embodiment of the present invention. In the laser color printer 100, photosensitive drums (image carriers) 20Y (yellow), 20M (magenta), 20C (cyan), and 20K (black) are disposed side by side along an extended surface of an intermediate transfer belt 50 which is supported by support rollers 102*a*, 102*b*, and 102*c*. The laser color printer 100 further includes an optical scan unit 105 (exposure unit); charging units (not shown), developing units 106Y, 106M, 106C and 106K; a primary transfer roller (not shown) disposed inside the intermediate transfer belt 50; a cleaning unit (not shown); and a neutralizing unit (not shown).

The optical scan unit 105 is configured to emit laser beams L1, L2, L3, and L4 in accordance with image information signals for the various colors. The laser beams L1, L2, L3, and L4 hit the photosensitive drums 20Y, 20M, 20C, and 20K, thereby forming electrostatic latent images of the various color components on the photosensitive drums 20Y, 20M, 20C, and 20K. The latent images are thereafter rendered into visible toner images by the developing units 106Y, 106M, 106C, and 106K, as well known in the art.

The toner images of the various colors are successively transferred onto the intermediate transfer belt 50, forming an overlaid color image. The overlaid image is then transferred onto a transfer sheet 120 (recording medium) by the secondary transfer roller 102*d*. The transfer sheet 120 is fed from the sheet-feeding cassette 111 at a predetermined timing. Thereafter, the intermediate transfer belt 50 is cleaned by the cleaning unit. The transfer sheet 120 with the color image transferred thereon is transported to the fusing unit 114 where the color image is fused onto the transfer sheet 120 using heat and pressure. The fused transfer sheet is then ejected onto an ejected sheet tray 110.

Figure 2:
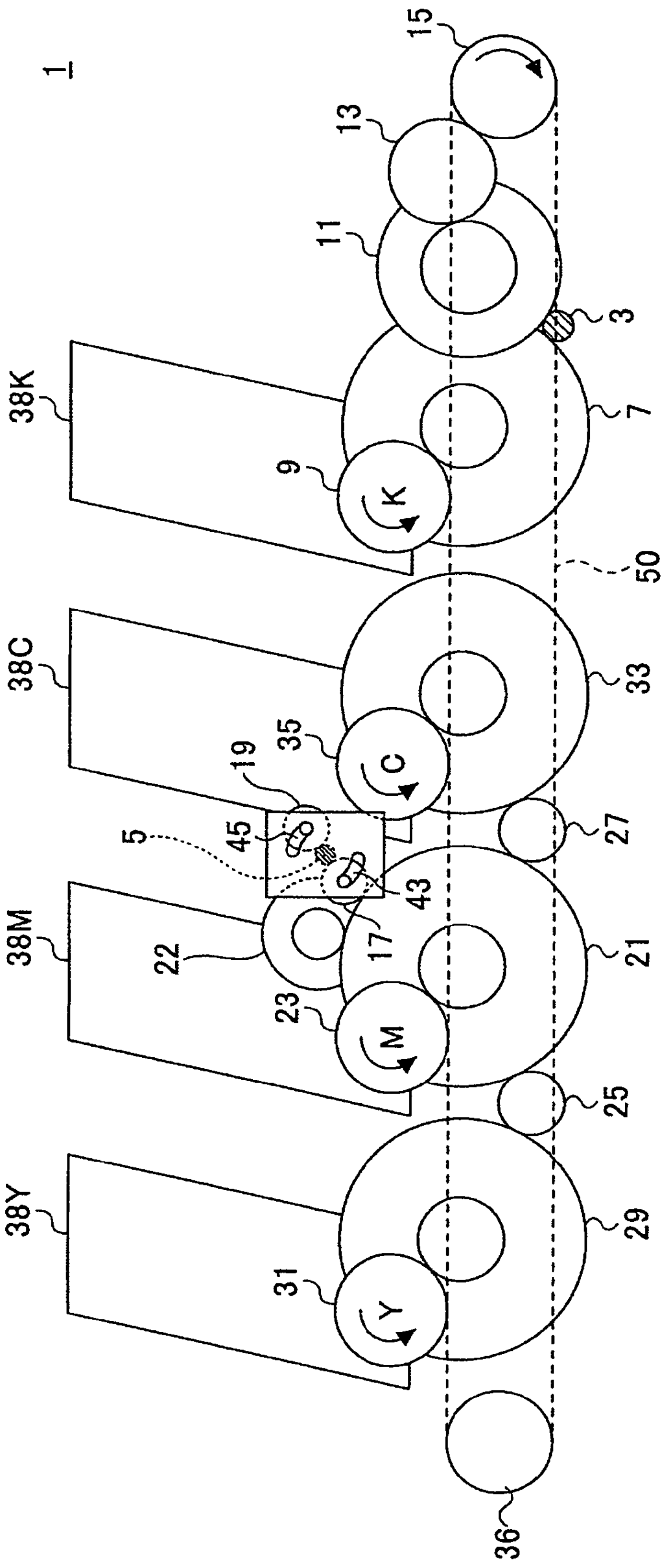
FIG. 2 illustrates a drive mechanism of the laser color printer in a high-speed mode.

FIG. 2 illustrates a drive mechanism 1 for the image forming apparatus 100. In FIG. 2, the intermediate transfer belt 50 (indicated by broken lines) is supported across belt gears 36 and 15, which are integrally formed with the support rollers 102*a* and 102*b*, respectively. The drive mechanism 1 includes a drive gear 3 for driving the photosensitive drum 20K and a drive gear 5 for driving the color photosensitive drums 20Y, 20M, and 20C. The drive gears 3 and 5 are fixed to rotating shafts 6*a* of FG-output-type motors 6 (drive source), as will be described below.

The drive gear 3 is meshed with a speed-reduction gear 7. The speed-reduction gear 7 is meshed with a drum gear 9 that is integral with the photosensitive drum 20K. The speed-reduction gear 7 is also meshed with a speed-reduction gear 11. The speed-reduction gear 11 is coupled with a belt gear 15 via an idler gear 13. The belt gear 15 is integral with the support roller 102*b*. Rotation of the motor 6 for the drive gear 3 in counter-clockwise direction ("second direction") causes the drum gear 9 to rotate in a direction indicated by the corresponding arrow (counter-clockwise direction) via the speed-reduction gear 7. At the same time, the belt gear 15 is caused to rotate in a direction indicated by the corresponding arrow (clockwise direction).

The drive gear 5 for driving the color photosensitive drums 20Y, 20M, and 20C is meshed with swing gears 17 and 19. The swing gear 17 is engageable with a speed-reduction gear 21. The other swing gear 19 is engageable with a speed-reduction gear 22 meshed with the speed-reduction gear 21. The speed-reduction gear 21 is also meshed with a drum gear 23 that is integral with the photosensitive drum 20M. Idler gears 25 and 27 are meshed with the speed-reduction gear 21 on an input end. The idler gear 25 is further engaged with a drum gear 31 via a speed-reduction gear 29. The drum gear 31 is integral with the photosensitive drum 20Y. The idler gear 27 is also engaged with a drum gear 35 via a speed-reduction gear 33. The drum gear 35 is integral with the photosensitive drum 20C.

The belt gear 36 is integral with the support roller 102*a* (FIG. 1). Toner supply units 38Y, 38M, 38C, and 38K are configured to supply the various colors of toner to the developing unit 106Y, 106M, 106C, and 106K. The speed-reduction gear 22 is disposed above a center line of the photosensitive drum 20M (magenta); namely, the drum gear 23. In this way, the space between the photosensitive drums 20M and 20C and additionally defined by the toner supply unit 38C, for example, can be effectively utilized for a structure (including the swing gears 17 and 19 and guide openings 43 and 45) for enabling the switching between the high-speed mode and the low-speed mode, as will be described later.

Figure 3A:
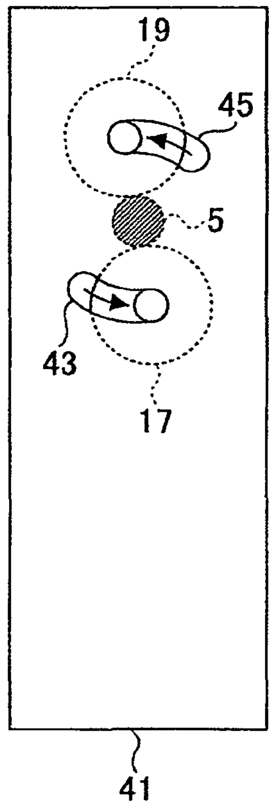
FIG. 3A illustrates a swing-gear mechanism in the drive mechanism of the laser color printer.
Figure 3B:
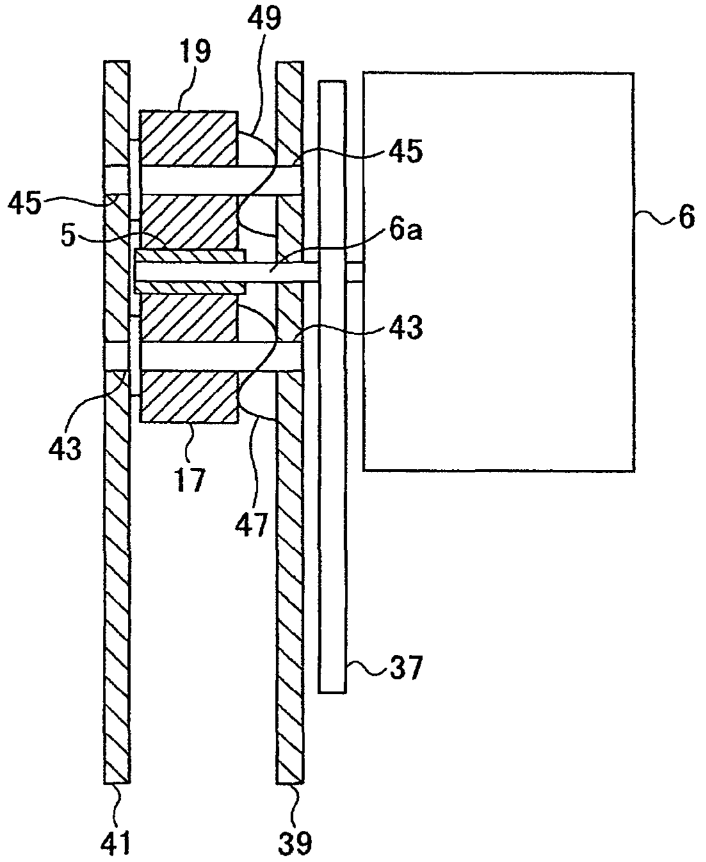
FIG. 3B illustrates an assembly of a motor (drive source) and the swing-gear mechanism.

FIG. 3A illustrates a swing-gear mechanism, and FIG. 3B illustrates an assembly of the FG-output-type motor 6, the drive gear 5, and the swing gears 17 and 19. The FG-output-type motor 6 to which the drive gear 5 is fixed may include a frequency generator for detecting a rotation speed by an electromagnetic pattern generating method. The electromagnetic pattern generating method may involve generating a pulse signal using an electromagnetic pattern (rotation speed detecting unit) disposed between a rotating part and a fixed part (which are not illustrated) of the motor 6 when the motor 6 rotates by a predetermined angle. The time interval of generation of such pulse signals may be detected as a speed and supplied for a feedback control.

Referring to FIG. 3B, the motor 6 is supported on a motor circuit board 37 (drive source fixing unit) and a frame 39. On the motor circuit board 37, there may be formed the FG pattern as a part of the aforementioned electromagnetic pattern. The swing gears 17 and 19 are supported between the frame 39 and another frame 41 having the guide openings 43 and 45 in them. The swing gears 17 and 19 are movable in the guide openings 43 and 45. The swing gears 17 and 19 are pressurized in a thrust direction by thrust springs 47 and 49. The gears 17 and 19 are integral with shafts that are movable in the guide openings 43 and 45. The guide openings 43 and 45 have a smooth arc shape so that the shafts of the gears 17 and 19 can smoothly move therein. The ends of the guide openings 43 and 45 have a shape conforming to the circumferential surface of the shafts of the swing gears 17 and 19.

When the motor 6 rotates in one direction or the other, the swing gears 17 and 19 are displaced in the guide openings 43 and 45 by a pressing force provided by the rotation of the motor 6, so that the swing gears 17 and 19 rotate with their shafts abutted against one or the other end of the guide openings 43 and 45. FIG. 3A illustrates the case where the swing gear 17 is displaced to the right while the swing gear 19 is displaced to the left with reference to the drawing in a swinging motion when the motor 6 rotates in counter-clockwise direction ("second direction") in the low-speed mode.

On the other hand, in the high-speed mode, the motor 6 rotates in clockwise direction ("first direction") with reference to FIGS. 2 and 3, for example. In this case, the swing gear 17 is displaced to the left and meshed with the speed-reduction gear 21 as illustrated in FIG. 2, so that the color photosensitive drums 20M, 20Y, and 20C are rotated at high speed. In this case, the swing gear 17, the speed-reduction gear 21, and the drum gear 23 constitute a first drive gear series for the high-speed mode, the swing gear 17 being the most upstream gear. The swing gear 19, the speed-reduction gear 22, the speed-reduction gear 21 and the drum gear 23 constitute a second drive gear series (for the low-speed mode), with the swing gear 19 being the most upstream gear.

Figure 4:
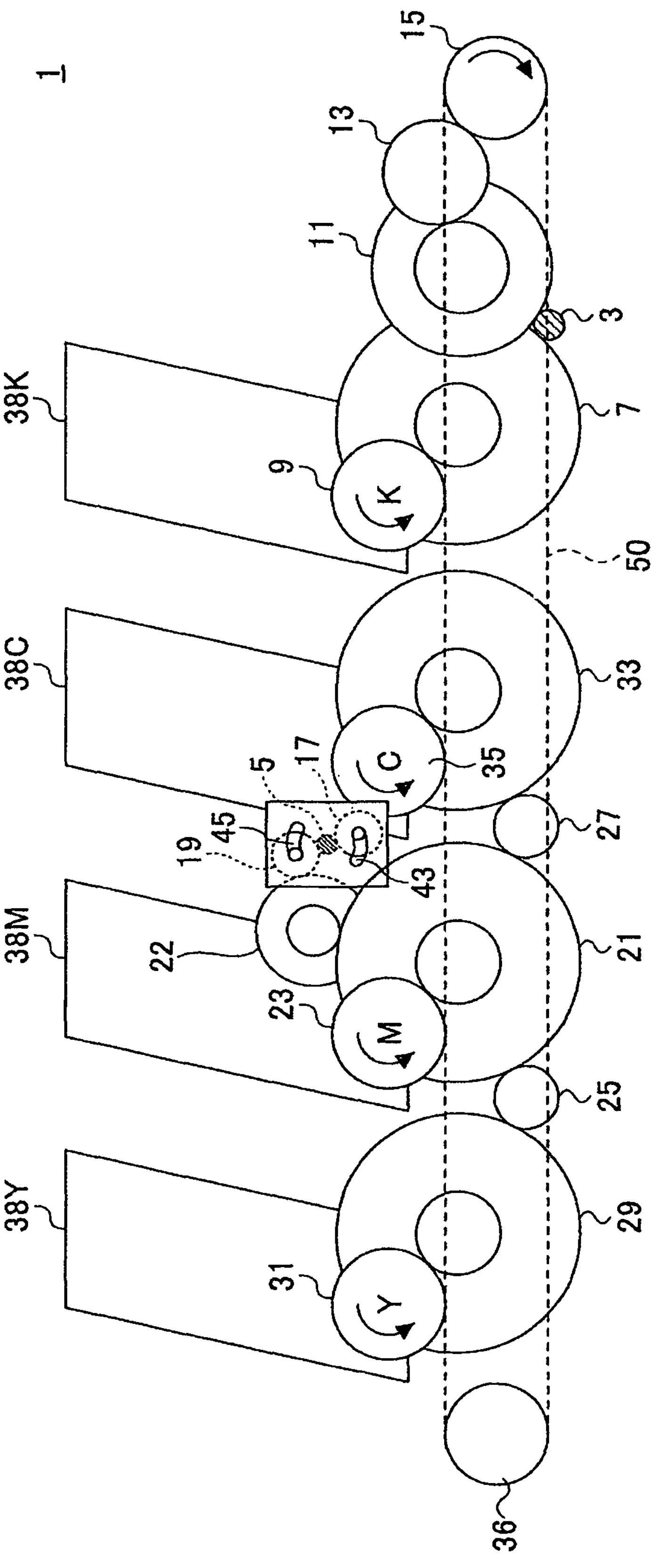
FIG. 4 illustrates the drive mechanism of the laser color printer according to the present embodiment in a low-speed mode.

When the motor 6 rotates in the first (clockwise) direction with reference to FIG. 2, for example, the swing gear 19 is disengaged from the speed-reduction gear 22, so that the second drive gear series is rendered incapable of transmitting drive power. Referring to FIG. 4, when the motor 6 rotates in the second (counter-clockwise) direction for the low-speed mode, the swing gear 19 is meshed with the speed-reduction gear 22, so that the color photosensitive drums 20M, 20Y, 20C are rotated at a low speed. In the low-speed mode, the swing gear 17 is disengaged from the speed-reduction gear 21, thus rendering the first drive gear series incapable of transmitting drive power. The structure including the drive gear 5, the first drive gear series, the second drive gear series, and the swing-gear mechanism may be hereafter referred to as a "speed switch unit".

that satisfies the condition that the gear meshing frequency be below 100 Hz, which corresponds to the low-frequency sound that is hard for humans to hear. In this case, the gear meshing frequency is 93.3 Hz, indicating a sufficient decrease in noise.

In accordance with the present embodiment, in order to switch to the low-speed mode, the motor 6 is rotated in the second direction so that the motor 6 is engaged with the speed-reduction gear 21 via the swing gear 19 and the speed-reduction gear 22. Thus, a lower rotation speed is achieved by increasing the reduction ratio compared to the case where the motor 6 is rotated in the first direction.

Thus, the difference in the number of rotations of the photosensitive drums between the high-speed mode and the low-speed mode is provided by varying the reduction ratio of the drive gear series while the number of rotations of the motor 6 is set at a constant value of 700 rpm, for example. In this way, two or more speed modes can be realized without changing the rotation speed of the motor 6, so that the rotation speed of the motor 6 can be set to a low speed at all times that contributes to a decrease in noise. Thus, the gear meshing frequency of the drive gear 5 can be made lower than the low-frequency sound of 100 Hz in any of the multiple speed modes.

TABLE 2

| Drive gear | 5 (for color drums) | | 3 (for (K) drum) | | 3 (for belt 50) | |
|---|---|---|---|---|---|---|
| Gear sequence | 5→17→ 21→23 | 5→19→22→ 21→23 | 3→7→9 | 3→7→9 | 3→11→ 13→15 | 3→11→ 13→15 |
| Speed mode | High | Low | High | Low | High | Low |
| Rpm of drive source | 700.0 | 700.0 | 1400.0 | 700.0 | 1400.0 | 700.0 |
| Gear ratio | 7.4 | 14.9 | 14.9 | 14.9 | 12.0 | 12.0 |
| Output (W) | 18 | 9 | 13 | 6 | 13 | 6 |
| Shaft torque (N · m) | 0.126 | 0.252 | 0.089 | 0.089 | 0.089 | 0.089 |
| Sound pressure level (dBA) | 50.0 | 49.0 | 53.0 | 49.0 | 53.0 | 49.0 |
| Meshing frequency (Hz) | 93.3 | 93.3 | 186.7 | 93.3 | 186.7 | 93.3 |

*Reduction ratio is the ratio of the numbers of rotation of the drive source to the photosensitive drum or the support roller.

Table 1 below illustrates a specification of the drive mechanism 1 according to an embodiment of the present invention.

TABLE 1

| | |
|---|---|
| Torque of photosensitive drum and roller 102b | 0.5 N · m |
| Number of photosensitive drums driven by drive gear 5 | 3 |
| Gear transmission efficiency | 0.95 |
| Rotation speed (rpm) of photosensitive drum (high-speed mode) | 94.03 |
| Rotation speed (rpm) of photosensitive drum (low-speed mode) | 47.02 |
| Rotation speed (rpm) of support roller 102b (high-speed mode) | 117.00 |
| Rotation speed (rpm) of support roller 102b (low-speed mode) | 58.50 |
| Number of teeth of drive gear 5 | 8 |

*The number of teeth of drive gear 5 may be selected depending on the cost of bar material prior to formation of teeth in it.

In accordance with the present embodiment, the number of rotations of the motor 6 in the high-speed mode may be set at 700 rpm, as illustrated in Table 2. 700 rpm is a relatively low speed that can be controlled by a FG-output-type motor and Table 2 corresponds to a case where the aforementioned speed switch unit (including the drive gear, the first and the second drive gear series, and the swing-gear mechanism) is not applied to the drive gear 3 for the photosensitive drum 20K (for black). However, in another embodiment of the present invention, the speed switch unit may be applied to the drive gear 3 for the photosensitive drum 20K in the same way as for the color photosensitive drums 20Y, 20M, and 20C for enhanced noise reduction purposes.

Figure 5:
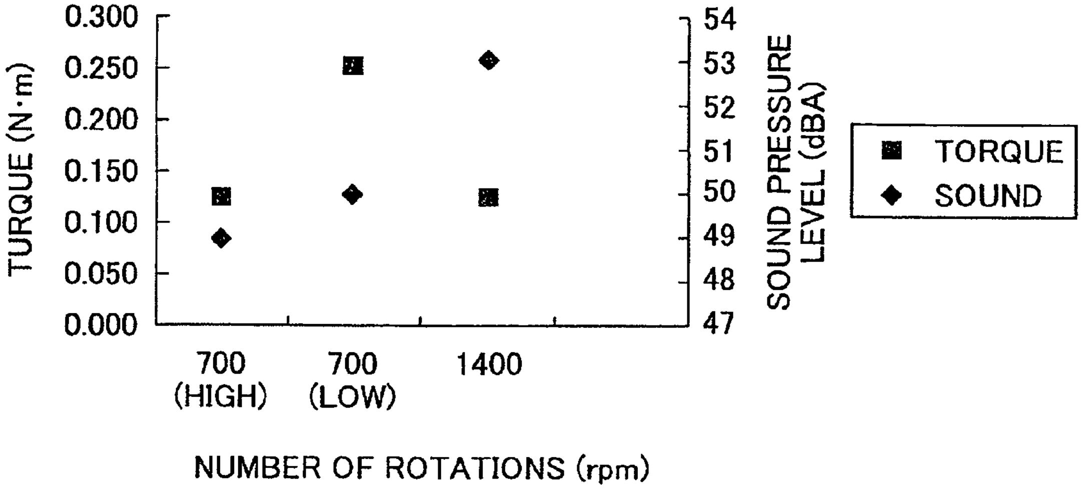
FIG. 5 is a graph indicating torque sound pressure level with respect to the number of rotations of the drive source.

FIG. 5 is a graph indicating torque and sound pressure level with respect to the number of rotations (rpm). The initial rpm of "700" is the number of rotations in the high-speed mode. The second rpm of "700" is the number of rotations in the low-speed mode. In the low-speed mode, torque increases due to the increased reduction ratio. The corresponding values are shown in Table 3.

| rpm | Torque (N · m) | Sound pressure level (dBA) |
|---|---|---|
| 700.0 (High-speed mode) | 0.126 | 49.0 |

-continued

| rpm | Torque (N · m) | Sound pressure level (dBA) |
|---|---|---|
| 700.0 (Low-speed mode) | 0.252 | 50.0 |
| 1400.0 | 0.126 | 53.0 |

Figure 6:
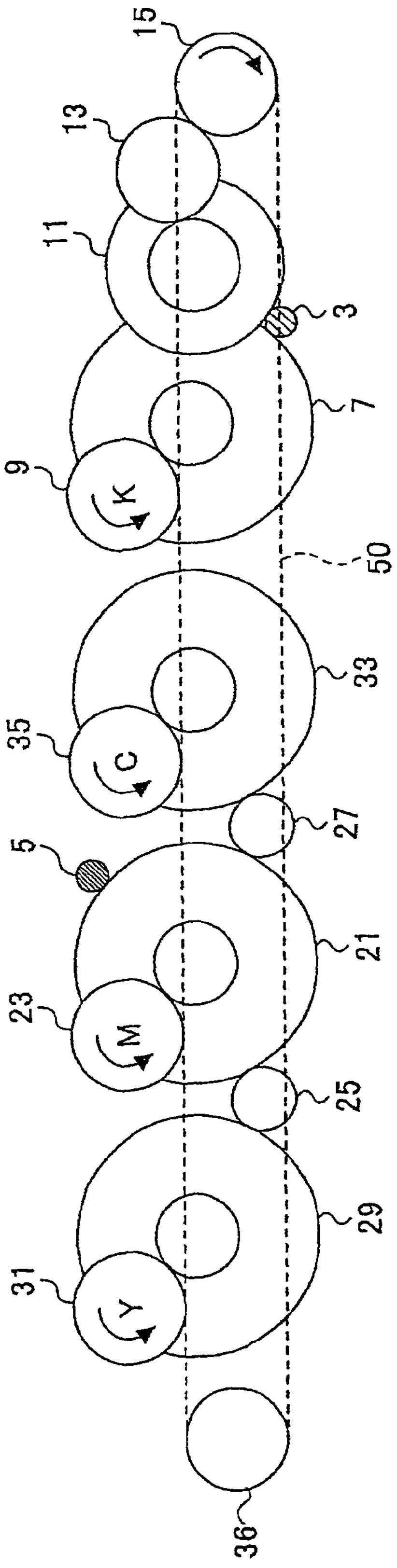
FIG.6 Conventional Art
FIG. 6 illustrates a drive mechanism according to a conventional technology.

FIG. 6 illustrates a conventional drive mechanism in which the speed switch unit according to the foregoing embodiment of the present invention is not used. As illustrated, the drive gear 5 is directly meshed with the speed-reduction gear 21. Thus, drive power from the drive source is transmitted by a series of drive gears including the drive gear 5, the speed-reduction gear 21, and the drum gear 23 in a fixed manner, so that the rotation direction of the motor 6 is fixed to the second direction (counter-clockwise direction).

In this conventional example, the number of rotations of the motor 6 in the low-speed mode may be fixed at 700 rpm while the high-speed mode may be provided by doubling the rotation speed of the motor 6 to 1400 rpm. In this case, in the high-speed mode, the gear meshing frequency of the drive gear 5 is 186.7 Hz as illustrated in Table 4 below, which is far above the low-frequency sound threshold of 100 Hz, resulting in a large noise level. If the rotation speed in the high-speed mode is lowered in order to reduce the noise, the decrease in rotation speed is directly reflected in the low-speed mode because of the fixed reduction ratio of the drive gear series. As a result, the rotation speed in the low-speed mode greatly decreases, making it impossible to control the FG-output-type motor 6.

TABLE 4

| Drive gear | 5 (for color drums) | | 3 (for (K) drum) | | 3 (for belt 50) | |
|---|---|---|---|---|---|---|
| Gear sequence | 5→21→23 | 5→21→23 | 3→7→9 | 3→7→9 | 3→11→13→15 | 3→11→13→15 |
| Speed mode | High | Low | High | Low | High | Low |
| Rpm of drive source | 1400.0 | 700.0 | 1400.0 | 700.0 | 1400.0 | 700.0 |
| Gear ratio | 14.9 | 14.9 | 14.9 | 14.9 | 12.0 | 12.0 |
| Output (W) | 18 | 9 | 13 | 6 | 13 | 6 |
| Shaft torque (N · m) | 0.126 | 0.126 | 0.089 | 0.089 | 0.089 | 0.089 |
| Sound pressure level (dBA) | 53.0 | 49.0 | 53.0 | 49.0 | 53.0 | 49.0 |
| Meshing frequency (Hz) | 186.7 | 93.3 | 186.7 | 93.3 | 186.7 | 93.3 |

*Reduction ration values may be in integers so that an image position error due to motor vibration can be cancelled.

Although this invention has been described in detail with reference to certain embodiments, variations and modifications exist within the scope and spirit of the invention as described and defined in the following claims.

The present application is based on Japanese Priority Application No. 2009-198660 filed Aug. 28, 2009, the entire contents of which are hereby incorporated by reference.

What is claimed is:

1. A swing-gear mechanism, comprising:
- a frame having a first arch-shaped guide opening and a second arch-shaped guide opening, each of the first and second arch-shaped guide openings has the same size and shape and has a first end and a second end, respectively;

- a first swing gear supported by the frame with a shaft of the first swing gear being guided in the first arch-shaped guide opening;
- a second swing gear supported by the frame with a shaft of the second swing gear being guided in the second arch-shaped guide opening; and
- a drive gear meshed with the first and the second swing gears and configured to rotate in a first or a second direction,
- wherein the first swing gear and the second swing gear are displaced to one end of the corresponding arch-shaped guide openings upon rotation of the drive gear in the first direction, or to the other end of the corresponding arch-shaped guide openings upon rotation of the drive gear in the second direction.

2. The swing-gear mechanism according to claim 1, wherein the first swing gear is meshed with a first series of gears upon rotation of the drive gear in the first direction, and
- the second swing gear is meshed with a second series of gears upon rotation of the drive gear in the second direction,
- the second series of gears having a larger gear ratio than the first series of gears.

3. An image forming apparatus comprising the swing-gear mechanism according to claim 1.

4. An image forming apparatus having a high-speed mode and a low-speed mode, the apparatus comprising:
- a drive source configured to be rotated in a first direction or a second direction;
- an image carrier configured to be rotated by the drive source;
- an optical scanning unit configured to scan the image carrier with a beam of light in order to form an electrostatic latent image on the image carrier;
- a developing unit configured to develop the electrostatic latent image on the image carrier into a visible image;
- a transfer unit configured to transfer the visible image onto a recording medium directly or indirectly; and
- a speed switch unit configured to select the high-speed mode or the low-speed mode by switching a rotation direction of the drive source, the speed switch unit including
- a frame having a first arch-shaped guide opening and a second arch-shaped guide opening, each of the first and second arch-shaped guide openings has the same size and shape and has a first end and a second end, respectively;

a swing gear mechanism supported by the frame with a shaft of the swing gear mechanism being guided in the first and second arch-shaped guide openings;

a drive gear meshed with the swing gear mechanism at one end and attached to a rotating shaft of the drive source at the other end;

a first drive gear series configured to transmit a rotating power of the drive source upon rotation in the first direction to the image carrier; and a second drive gear series configured to transmit a rotating power of the drive source upon rotation in the second direction to the image carrier, the second drive gear series having a larger reduction ratio than the first drive gear series, wherein the speed switch unit is configured to cause the drive gear to be selectively connected to the first drive gear series or the second drive gear series depending on the rotating direction of the drive source.

5. The image forming apparatus according to claim 4, wherein a most upstream one of gears in the first drive gear series and the second drive gear series is meshed with the drive gear, the swing-gear mechanism is configured to cause the most upstream gear of the first drive gear series to be displaced in such a direction upon rotation of the drive source in the first direction that the first drive gear series is connected to the drive gear, or cause the most upstream gear of the second drive gear series to be displaced in such a direction upon rotation of the drive source in the second direction that the second drive gear series is connected to the drive gear.

6. The image forming apparatus according to claim 4, wherein the number of transmission gears in the second drive gear series is greater than the number of transmission gears in the first drive gear series by one.

7. The image forming apparatus according to claim 4, wherein the drive source includes a motor having a frequency generator configured to detect a rotation speed of the motor for a feedback control of the rotating speed of the drive source.

8. The image forming apparatus according to claim 7, wherein the number of rotations of the drive source is set such that the rotating speed of the drive source can be controlled and the gear meshing frequency of the drive source is less than 100 Hz.

9. The image forming apparatus according to claim 8, wherein the number of rotations of the drive source is the same in the high-speed mode and the low-speed mode.

10. The swing-gear mechanism according to claim 1, wherein when the first swing gear is displaced to the first end of the first arch-shaped guide opening upon rotation of the drive gear in one direction, the second swing gear is displaced to the second end of the second arch-shaped guide openings.

11. The swing-gear mechanism according to claim 1, wherein when the first swing gear is displaced to the second end of the first arch-shaped guide opening upon rotation of the drive gear in one direction, the second swing gear is displaced to the first end of the second arch-shaped guide openings.

12. The swing-gear mechanism according to claim 1, wherein a number of rotations of photoconductor elements between a high-speed mode and a low-speed mode is different due to the varying reduction ratio of the corresponding first and second series of gears while a number of rotations of the driving source is the same in the high-speed mode and the low-speed mode.

13. The swing-gear mechanism according to claim 1, wherein the first and second swing gears are supported between the frame and another frame having corresponding arch-shaped guide openings.

14. The swing-gear mechanism according to claim 1, wherein the first and second swing gears are pressurized in a thrust direction by thrust springs.

15. The swing-gear mechanism according to claim 1, wherein ends of the first and second arched-shaped openings have a shape conforming to a circumferential surface of shafts of the first and second swing gears.

16. The swing-gear mechanism according to claim 1, further comprising a drive source configured to rotate in a first direction or a second direction.

17. The swing-gear mechanism according to claim 16, wherein in a high-speed mode, the drive source rotates in the first direction so that the first swing gear mesh with a first series of gears.

18. The swing-gear mechanism according to claim 17, wherein the first series of gears comprises the first swing gear, a speed-reduction gear, and a drum gear for high-speed mode, and when the drive source rotates in the first direction for the high-speed, the first swing gear is meshed with the speed-reduction gear so that photoconductor elements are rotated at high speed.

19. The swing-gear mechanism according to claim 16, wherein in a low-speed mode, the drive source rotates in the second direction so that the second swing gear mesh with a second series of gears.

20. The swing-gear mechanism according to claim 19, wherein the second series of gears comprises the second swing gear, a first speed-reduction gear, a second speed-reduction gear and a drum gear for low-speed mode, and when the drive source rotates in the second direction for the low-speed, the second swing gear is meshed with the first speed-reduction gear so that photoconductor elements are rotated at low speed.

* * * * *

UNITED STATES PATENT AND TRADEMARK OFFICE

CERTIFICATE OF CORRECTION

PATENT NO. : 8,417,155 B2
APPLICATION NO. : 12/805673
DATED : April 9, 2013
INVENTOR(S) : Tatsuo Fukushima et al.

It is certified that error appears in the above-identified patent and that said Letters Patent is hereby corrected as shown below:

Title Page, Item (73) Assignee: Ricoh Company, Limited, Tokyo – should read
– Ricoh Company, Ltd., Tokyo Signed and Sealed this
Twenty-fifth Day of June, 2013

Teresa Stanek Rea
*Acting Director of the United States Patent and Trademark Office*